United States Patent
Matsumura et al.

[11] Patent Number: 5,981,108
[45] Date of Patent: Nov. 9, 1999

[54] ELECTRODES FOR BATTERY AND METHOD OF FABRICATING THE SAME

[75] Inventors: Jun Matsumura, Otsu; Kuninori Omura, Kamakura, both of Japan; Chikara Kasai, Chula Vista, Calif.; Sadaaki Yokoh, Yokohama; Hitoshi Mikuriya, Chigasaki, both of Japan

[73] Assignee: Matsushita Electric Industrial Co, Ltd., Osaka-fu, Japan

[21] Appl. No.: 08/933,325

[22] Filed: Sep. 18, 1997

Related U.S. Application Data

[63] Continuation-in-part of application No. 08/600,622, Feb. 13, 1996, Pat. No. 5,721,073.

[30] Foreign Application Priority Data

Oct. 9, 1995 [JP] Japan .............................. HEI7-261267

[51] Int. Cl.$^6$ .............................. H01M 4/26; H01M 4/70
[52] U.S. Cl. ........................ 429/233; 429/233; 429/235; 29/623.5
[58] Field of Search .................... 429/233, 235, 429/244, 623.1, 623.5

[56] References Cited

U.S. PATENT DOCUMENTS

| | | |
|---|---|---|
| 3,951,688 | 4/1976 | Pankow et al. ........................... 136/67 |
| 4,251,603 | 2/1981 | Matsumoto et al. . |
| 4,582,098 | 4/1986 | Matsumoto et al. . |
| 5,196,281 | 3/1993 | Pensabene et al. . |
| 5,434,020 | 7/1995 | Cooper . |
| 5,487,961 | 1/1996 | Strangeways et al. . |
| 5,498,496 | 3/1996 | Sasaki et al. . |
| 5,637,416 | 6/1997 | Yoshii et al. .............................. 429/94 |
| 5,651,399 | 7/1997 | Hollandet al. ............................ 141/32 |
| 5,721,073 | 2/1998 | Matsumura et al. ..................... 429/223 |

FOREIGN PATENT DOCUMENTS

| | | |
|---|---|---|
| 0 126 160 A1 | 11/1984 | European Pat. Off. . |
| 0 301 647 A1 | 2/1989 | European Pat. Off. . |
| 2 711 015 A1 | 4/1995 | France . |
| A 55-041 680 | 3/1980 | Japan . |
| A 55-166 865 | 12/1980 | Japan . |
| 58-161251 | 9/1983 | Japan .............................. H01M 4/26 |
| A 58-161 251 | 9/1983 | Japan . |
| A 59-143 275 | 8/1984 | Japan . |
| A 59-207 560 | 11/1984 | Japan . |
| A 60-133 655 | 7/1985 | Japan . |
| 62-140359 | 6/1987 | Japan .............................. H01M 4/02 |
| A 62-139 256 | 6/1987 | Japan . |
| A 62-140 359 | 6/1987 | Japan . |
| A 62-147 657 | 7/1987 | Japan . |
| A 05 006 762 | 1/1993 | Japan . |
| A 07 65816 | 3/1995 | Japan . |

*Primary Examiner*—Maria Nuzzolillo
*Assistant Examiner*—Carol Chaney
*Attorney, Agent, or Firm*—Panitch Schwarze Jacobs & Nadel, P.C.

[57] ABSTRACT

An electrode for a battery with small variations in the discharge capacity and excellent reliability is disclosed. It comprises a sheet of porous metal substrate having three-dimensional communicating spaces for containing an active material. The substrate has a layer filled with the active material and occupying most of the thickness of the electrode, and a layer of current collector composed of a metallic foil which is not filled with active material and has reduced porosity.

7 Claims, 6 Drawing Sheets

ELECTRODES FOR BATTERY AND METHOD OF FABRICATING THE SAME

This application is a continuation-in-part of U.S. Ser. No. 00/600,662, filed on Feb. 13, 1996, now U.S. Pat. No. 5,721,073.

BACKGROUND OF THE INVENTION

The present invention relates to an electrode for a battery, particularly a nickel electrode for an alkaline storage battery and to a method of fabricating the same.

Electrodes for a battery are roughly classified into three types: paste-type, sintered-type and pocket-type. Recently, a method for fabricating paste-type electrodes has been widely used practically as a new method for fabricating nickel electrodes for alkaline storage batteries. The method comprises a step of filling a pasty mixture (hereinafter referred to as "paste") composed essentially of an active material powder into spaces formed in a substrate such as foamed metal or nonwoven fabric of nickel fibers having three-dimensional communicating spaces.

Such metal substrates have a high porosity such that the three-dimensional communicating spaces occupy 95% of the total substrate, and a maximal diameter of several hundreds $\mu$m for each space. This facilitates filling of an active material powder or a paste directly into the spaces, and finishing the resultant metal substrates to electrodes in a simple process.

Conventional practical and specific methods of filling a paste of an active material into the spaces of a metal substrate include a method of vibrating the paste to squeeze it into the spaces, a method of rubbing and filling the paste into the spaces using a tool such as doctor's blade, a method of bringing the paste into contact with one face of a metal substrate while decompressing the other face so as to squeeze the paste into the spaces, and a method of spraying the paste onto the spaces of a metal substrate from a nozzle.

Of these, the rubbing method and the spraying method are superior from the point of uniform filling of the active material paste into the spaces of the metal substrate. If compared, the spraying method is superior to the rubbing method because the former is excellent in durability and is more easy and simple in manipulating and maintaining the device for filling the paste.

Despite the above-mentioned merits, the spraying method has a drawback that uniform filling of the paste into the spaces of a metal substrate, such as foamed porous metal substrate, is difficult. In other words, the spraying method comprises a step of spraying a paste onto both faces of a foamed porous metal substrate at a certain rate while discharging the paste from a nozzle and filling it into the spaces of the substrate. This is disadvantageous in that some portions of the paste which first enter the substrate and are arrested proximal to the surfaces of the substrate are sometimes removed by an impinging action of the remaining portions of the paste which are to be sprayed subsequently. It is also disadvantageous in that the paste which has impinged on the surface of the substrate is sprung back from the surface.

Therefore, the spraying method is unsatisfactory from the point of uniform filling of a preadjusted amount of a paste into the spaces of a porous metal substrate and is to be improved in various points in the future. From the practical point of view, further control of the variations (dispersion) in the filled amount of paste and battery capacity is strongly desired.

SUMMARY OF THE INVENTION

The primary object of the present invention is to provide an electrode for a battery comprising a sheet or a plate-like porous metal substrate having three-dimensional communicating spaces, particularly a nickel electrode with minimal variations in the filled amount of an active material, and to provide a battery of large capacity with less variations in the discharge capacity.

The present invention provides an electrode for a battery comprising a sheet of porous nickel substrate having three-dimensional communicating spaces defined by a first principal face and a second principal face, most of the three-dimensional communicating spaces being filled with an active material supplied from the first principle face side, and subsequently being pressed to reduce the thickness of the sheet, wherein the substrate has a layer filled with the active material and occupying most of the thickness of the electrode, and a layer of current collector connected to the second principal face and composed of a metallic foil which is not filled with any active material and has reduced porosity.

The preferable porous metal substrate is any of foamed nickel, nonwoven fabric of nickel fibers, sintered nickel plaque, and sintered iron plaque plated with nickel.

In a preferred mode of the present invention, the layer of current collector is formed from a portion of the porous substrate which is not penetrated by the active material supplied from the first principle face side.

The present invention also provides a method of fabricating an electrode for a battery comprising the steps of:

providing a sheet or plate-like porous metal substrate having three-dimensional communicating spaces defined by a first principal face and a second principal face and placing a nozzle so as to oppose directly to the first principal face of the porous metal substrate for discharging an active material from this side, and filling the active material paste into the three-dimensional communicating spaces of the porous metal substrate by discharging it from the nozzle while transferring the metal substrate or the nozzle relative to the other, and controlling the transfer velocity so as not to allow the active material to penetrate through the substrate up to the second principal face of the substrate.

As a preferred specific method of fabricating the electrode for a battery, there is a method comprising the steps of:

transferring a belt-like porous metal substrate having three-dimensional communicating spaces along its longitudinal direction, filling a pasty mixture consisting essentially of an active material into the three-dimensional communicating spaces of the porous metal substrate by discharging the pasty mixture from a nozzle onto one face of the porous metal substrate at a controlled rate, while transferring the porous metal substrate, so that most of the porous metal substrate can be filled with the pasty mixture and some part not filled with the pasty mixture is retained on the other face side, and pressing the porous metal substrate to reduce its thickness.

In the process of filling the active material paste into the spaces of the porous metal substrate, the active material paste is preferably filled in a depth of about 60% to about 90%, more preferably in a depth of about 80%, from the first principal face toward the second principal face. Compression of the porous metal substrate, which has been filled with the active material in the previous process, to reduce its thickness results in an electrode in which a layer filled with the active material occupies about 95% to about 99%, more preferably about 97%, of the entire thickness of the substrate and eventually a layer of current collector occupies about 5% to about 1%, more preferably about 3%.

The layer of current collector formed from a portion of the porous metal substage lacking an active material after compression of the substrate preferably has a reduced porosity of about 10% to about 3%, more preferably about 7% to about 5%. If the layer has a porosity larger than this range, its role as a current collector as well as an electrode reinforcing material can not be fulfilled. Reduction of the porosity of this layer smaller than this range, on the other hand, requires compression of the porous substrate with a strong force. This produces various inconveniences such as crack development in the electrode. This also results in inhibition of the passage of an electrolyte into the active material through the current collector. Therefore, a layer of current collector having a porosity less than the above range is not suitable for a battery which is fabricated by alternately laminating a number of positive electrodes and negative electrodes while interposing separators therebetween.

In the above-mentioned method, it is preferable to maintain the distance between the porous metal substrate and the nib of the nozzle at 1.0 mm or smaller.

It is also preferable that the pasty mixture contains water as a dispersing medium by 20 wt % to 30 wt % of the whole paste mixture.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

According to the present invention, it is possible to prevent some portions of a paste which first enter the substrate and are arrested proximal to one surface of the substrate from being removed by an impinging action of the remaining portions of the paste which are to be sprayed subsequently, by discharging the paste from a nozzle to penetrate through only the spaces proximal to one face of the porous metal substrate, avoiding the spaces proximal to the other face. The present invention can also reduce the variations in the filled amount of paste by adequately controlling the filling amount of paste, thereby to allow production of an electrode having a favorable conductive network throughout an electrode plate and an increased battery capacity.

In the filling process, the distance of the porous metal substrate from the nib of the nozzle, placed proximal to one face of the substrate, is held at 1 mm or smaller. As a result, the paste discharged from the nib of the nozzle is stably filled and supplied into the spaces of the substrate constantly, resulting in reduction of variations in the filled amount of paste. Adequate reduction of water content in the paste can increase the actual filling density of the active material powder into the spaces of the porous metal substrate, thereby increasing the battery capacity.

In the following, the present invention will be described more specifically with reference to its preferred embodiments.

EXAMPLE 1

A paste was prepared in the following manner: 10 parts by weight of a cobalt hydroxide powder having a particle diameter of about 2 to 3 $\mu$m and 2 parts by weight of a zinc oxide powder having a particle diameter of about 5 $\mu$m were added to 100 parts by weight of a nickel hydroxide powder having an average particle diameter of 10 $\mu$m. Then, water was further added to the powdery mixture thus obtained as a dispersing medium by 20 wt % of the intended paste, and kneaded to obtain a paste.

Figure 1:
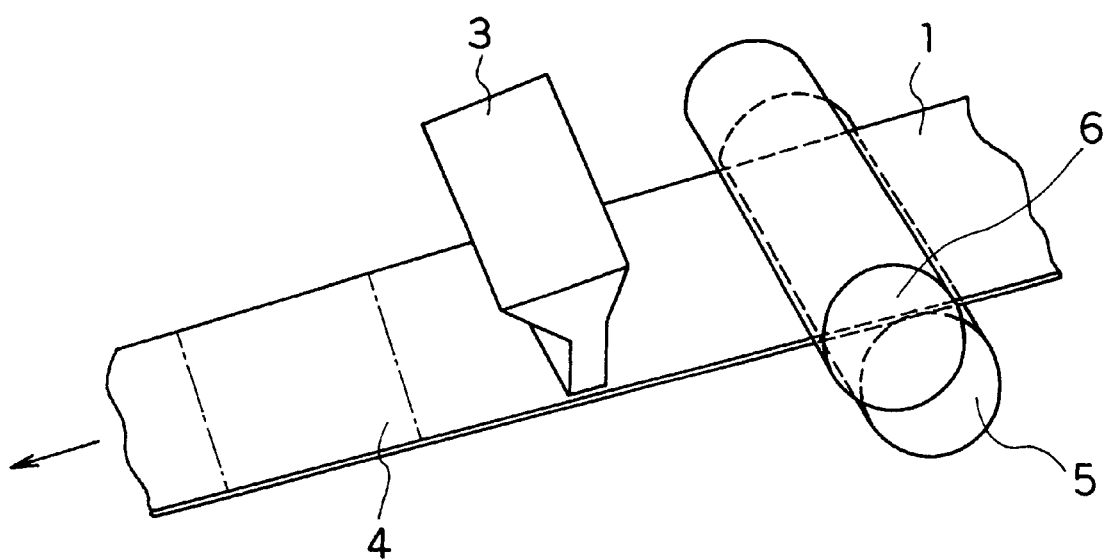
FIG. 1 is a schematic perspective view showing a method for fabricating an electrode in accordance with the present invention.
Figure 2:
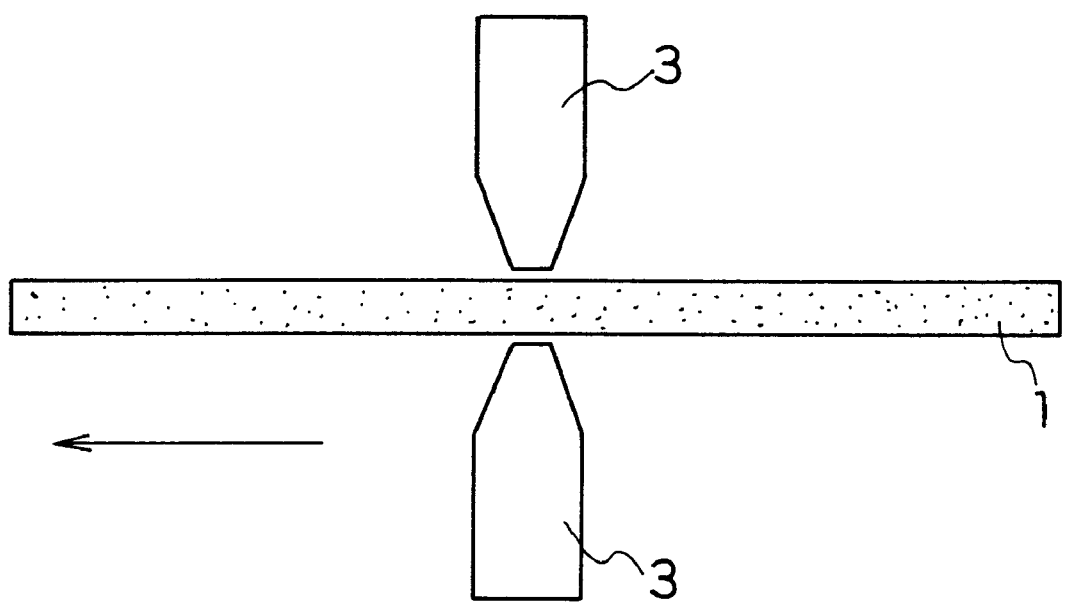
FIG. 2 is a schematic view showing a method for fabricating an electrode of a conventional example.

FIG. 1 schematically shows a mode of fabricating an electrode in accordance with the present invention. As shown in FIG. 1, a nozzle 3 was opposed to one face of a spongy belt-like porous nickel substrate 1 having a width of 120 mm, a thickness of 2.0 mm, a porosity of 98%, and an average pore diameter of 400 $\mu$m. Then, the paste prepared above was discharged from the nozzle 3 and filled into the spongy belt-like porous nickel substrate, while transferring the porous nickel substrate along the length of the substrate. Numerals 5 and 6 indicate rollers for transferring the porous substrate.

In this process, the distance between a nib of the nozzle 3 and the porous nickel substrate 1 was held at 0.1 mm and the paste was discharged from the nozzle 3 at a rate of 33 g/second and filled into the spaces of the porous nickel substrate. In filling the paste into the porous substrate, the transfer velocity of the porous substrate was adjusted so as not to allow the paste to penetrate through the porous substrate from one face to the other face, that is, so as to allow the paste to reach only up to about four-fifth of the thickness of the porous substrate, avoiding the remaining one-fifth. As a result, it was found that the preferable transfer velocity was 6 m/minute.

Although not shown in FIG. 1, a belt or a roller was provided on the face of the porous substrate 1 not opposed to the nozzle 3 for supporting the porous substrate, in order to prevent the distance between the nozzle and the porous substrate from being shifted by the pressure produced when the paste was pressed.

In the porous substrate filled with the paste in this way, the active material powder occupies about 50% of the total spaces of the porous substrate. The porous substrate was then pressed to a thickness of 0.8 mm. As a result, substantially all the spaces of the porous substrate could be filled with the paste perfectly. The portions filled with this paste as the active material occupied about 95% of the overall thickness of the porous substrate.

On the other hand, on the face of the porous substrate not opposed to the nozzle, the portions not filled with the paste were transformed to a layer of a foil because the nickel skeleton in these portions was densely pressed. The thickness of the foil was about 0.04 mm and the porosity was about 5%.

The porous substrate 1 filled with the paste as mentioned previously was cut to a rectangular sheet of 120 mm along the width of the substrate and 150 mm along the length of the substrate, as shown by the dotted line in FIG. 1. Then, a lead plate was spot-welded to the thus prepared electrode member 4 at a predetermined position, which gave an electrode "a". The active material filled into the electrode "a" weighed 54 to 60 g.

The spongy porous substrate used here was one prepared by plating nickel to a foamed polyurethane sheet with communicating cells and heating it to burn off polyurethane.

The porous substrate used here has a skeleton of 60 to 100 $\mu$m thickness; the superficial part is thickened and the central part is thinned.

For comparison, used was a porous substrate with graded porosities from 95% for one side to 92% for the other side, having a skeleton of 50 to 90 $\mu$m thickness and an average pore diameter of about 300 $\mu$m. An active material paste was filled into this porous substrate in the manner as described above until the paste was filled throughout the porous substrate from the high porosity side to the low porosity side, and then pressed to produce an electrode "b".

Separately, a porous substrate C1 having an original porosity of 94%, a skeleton of 60 to 80 $\mu$m thickness, an average pore diameter of about 300 $\mu$m, and a thickness of about 1.5 mm was joined with another porous substrate C2 having an original porosity of 97%, a skeleton of 30 to 50 $\mu$m thickness, an average pore diameter of about 800 $\mu$m, and a thickness of about 0.6 mm, which was then pressure-molded to a final thickness of 1.1 mm. As a result, the substrate C1 had a thickness of about 1 mm and a porosity of about 55%, and the substrate C2 had a thickness of about 0.1 mm and a porosity of about 10%. Subsequently, an active material paste was filled into the thus joined porous substrate until the paste was filled throughout the porous substrate from the high porosity substrate C1 to the low porosity substrate C2 in the manner as described above, and pressed to a thickness of 0.68 mm to produce an electrode "c".

The amount of active material filled into the electrode "b" was almost the same as that of the electrode "a". On the other hand, in the electrode "c", the amount filled was about a half of that of the electrode "a", because the electrode "c" was reduced in porosity by half when the porous substrates C1 and C2 were pressed together.

In each 100 sheets of these electrodes "a", "b" and "c", the presence or absence of cracks was examined after pressing process and compared. The results are shown in Table 1. As shown in Table 1, in the electrode "a" having portions not filled with the paste, only a few cracks developed even at a high capacity density of 680 mAh/cc per unit volume and the production yield was improved.

On the other hand, crack development was more frequent in the electrodes "b" and "c" in which the active material paste was filled throughout the porous substrate than in the electrode "a".

The reason why cracks were few in the electrode "a" may be that the electrode was reinforced by the layer of current collector of a foil, which is a part of the pressed porous nickel substrate.

TABLE 1

|  | Number of cracks |
| --- | --- |
| Electrode "a" | 2/100 |
| Electrode "b" | 10/100 |
| Electrode "c" | 12/100 |

EXAMPLE 2

A rectangular nickel-metal hydride storage battery having a nominal capacity of about 100 Ah was produced using 16 nickel positive electrodes produced in the same manner as in Example 1, known sheet-like separators, and 17 negative electrodes of a misch metal-nickel system hydrogen storage alloy. This was called rectangular battery "D" of one embodiment of the present invention.

Separately, other rectangular batteries "E" and "F" were produced in the manner as described above using the electrodes "b" and "c". Each 100 cells of the batteries "D", "E" and "F" were examined for their discharge capacities during a 1 C discharge at 0° C. The results are shown in Table 2. As apparent from Table 2, the discharge capacity during a high rate discharge is larger in the battery "D" than in the batteries "E" and "F". This difference may reflect the difference in current collectability from the active material, caused by the presence or absence of the layer of metallic current collector in the nickel positive electrode.

TABLE 2

|  | Discharge capacity at 1C (Ah) |
| --- | --- |
| Battery "D" | 95 |
| Battery "E" | 90 |
| Battery "F" | 85 |

EXAMPLE 3

A nickel electrode was produced in the same manner as in Example 1, except that the thickness of the layer where the active material was to be filled was varied so as to occupy 80 to 100% of the overall thickness of the electrode after being pressed. Nickel metal-hydride storage batteries were fabricated in the same manner as in Example 2, using these nickel electrodes.

Figure 3:
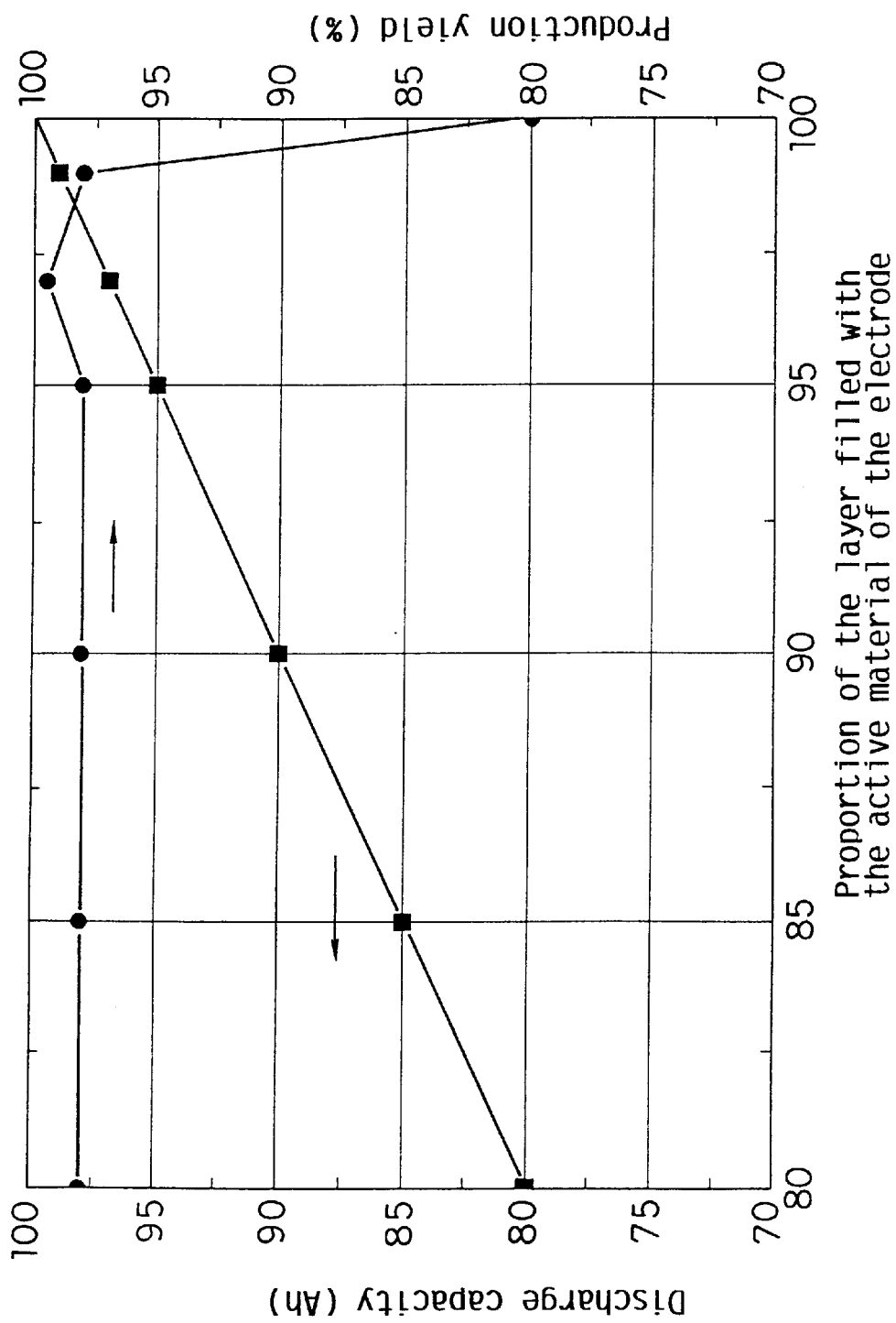
FIG. 3 shows the relation between the proportion of the layer filled with the active material in the nickel electrode and the production yield at the time of pressing the electrode.

FIG. 3 shows the relation between the proportion of the layer filled with the active material in the nickel electrode and the production yield at the time of pressing the electrode. It was found that when the layer filled with the active material occupied 95 to 99% and the layer of metallic current collector occupied 5 to 1% of the overall thickness of the electrode, the electrode could retain a high capacity and developed few cracks when being pressed, resulting in improved production yield.

As discussed above, when the electrode in accordance with the present invention is used, a storage battery with an improved high rate discharge characteristic can be obtained in which the electrode plate strength is increased and the electrode production yield is improved.

EXAMPLE 4

A paste was prepared in the following manner: 10 parts by weight of a metallic nickel powder having a particle diameter of 2 to 3 μm and 5 parts by weight of a cobalt oxide powder having a particle diameter of 2 to 3 μm were added to 100 parts by weight of a nickel hydroxide powder having an average particle diameter of 10 μm. Then, water was further added to the powdery mixture thus obtained as a dispersing medium by 20 wt % of the intended paste, and kneaded to obtain a paste. The porous metal substrate used was a spongy belt-like porous nickel substrate having a width of 100 mm, a thickness of 2.5 mm, a porosity of 98%, and an average pore diameter of 200 μm. The paste was filled into the porous substrate in the same manner as in Example 1, except that the distance between the nozzle and the porous metal substrate was varied and the porous substrate was transferred at 6 m/minute. Then, after the substrate was pressure-molded to a final thickness of 1.0 mm, the pressed porous substrate was cut to a sheet of 87 mm along the width of the substrate and 35 mm along the length of the substrate, and a lead plate was spot-welded to the substrate at a predetermined position.

An electrode group was assembled with three sheets of nickel electrode 7 produced in the above-mentioned manner, known separators 8 which envelop each of the nickel electrodes in a U-shape fashion and two U-shaped bent sheets of metal hydride negative electrode 9 of a misch metal-nickel system hydrogen storage alloy. The assembled electrode group was then inserted into a battery housing 10. After a predetermined amount of an alkaline electrolyte was injected into the housing and an open end of the housing was sealed with a sealing plate 11, a rectangular nickel-metal hydride storage battery was configured as shown in FIG. 4.

Figure 4:
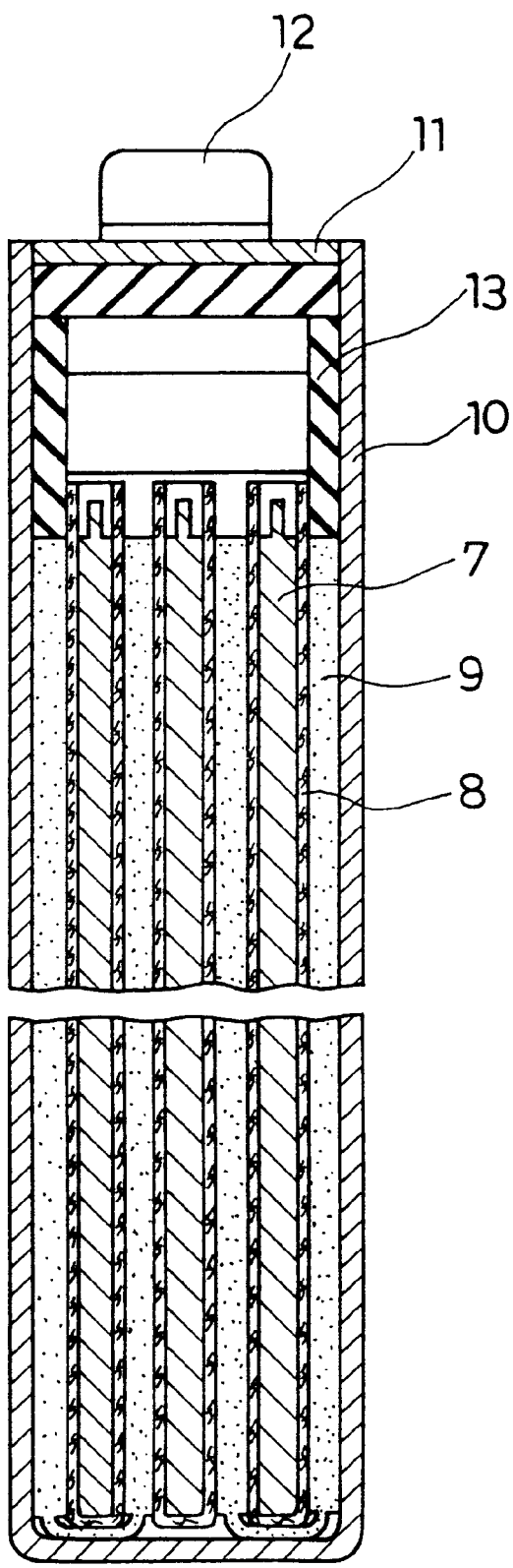
FIG. 4 is a partly fragmented cross-sectional view showing an example of a rectangular battery in accordance with the present invention.

As shown in FIG. 4, the assembled electrode group housed in the battery housing 10 made of nickel-plated steel which was sealed by the sealing plate 11 made of nickel-plated steel and welded on an open end of the battery housing 10. The sealing plate 11 was provided with a positive electrode terminal 12 which was insulated from the sealing plate 11 and a safety valve (not shown). The negative electrode 9 was connected to the battery housing 10 which serves as the negative electrode terminal.

Figure 5:
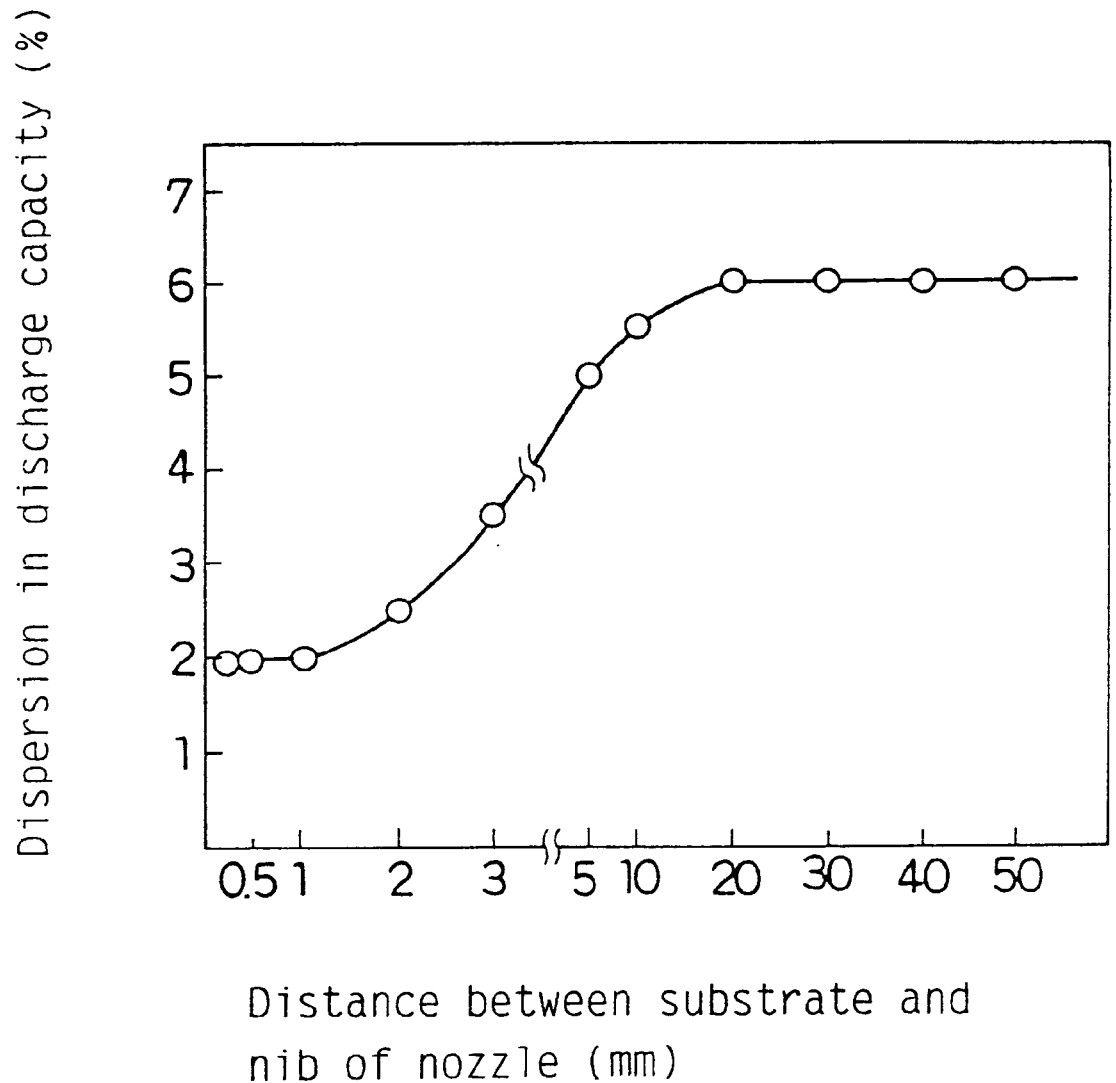
FIG. 5 is a diagram showing a relationship between the distance of the porous metal substrate from the nozzle used in the fabricating method in accordance with the present invention and the variations in the discharge capacity of the resultant battery.

FIG. 5 is a schematic illustration showing the correlation of the distance between the nozzle and the porous substrate with the variations in discharge capacity of the electrode group as a battery. As apparent from the figure, when the nozzle was held at a distance of 1.0 mm or less from the porous metal substrate, the paste could be supplied stably, which resulted in successful reduction of the variations in discharge capacity.

EXAMPLE 5

Figure 6:
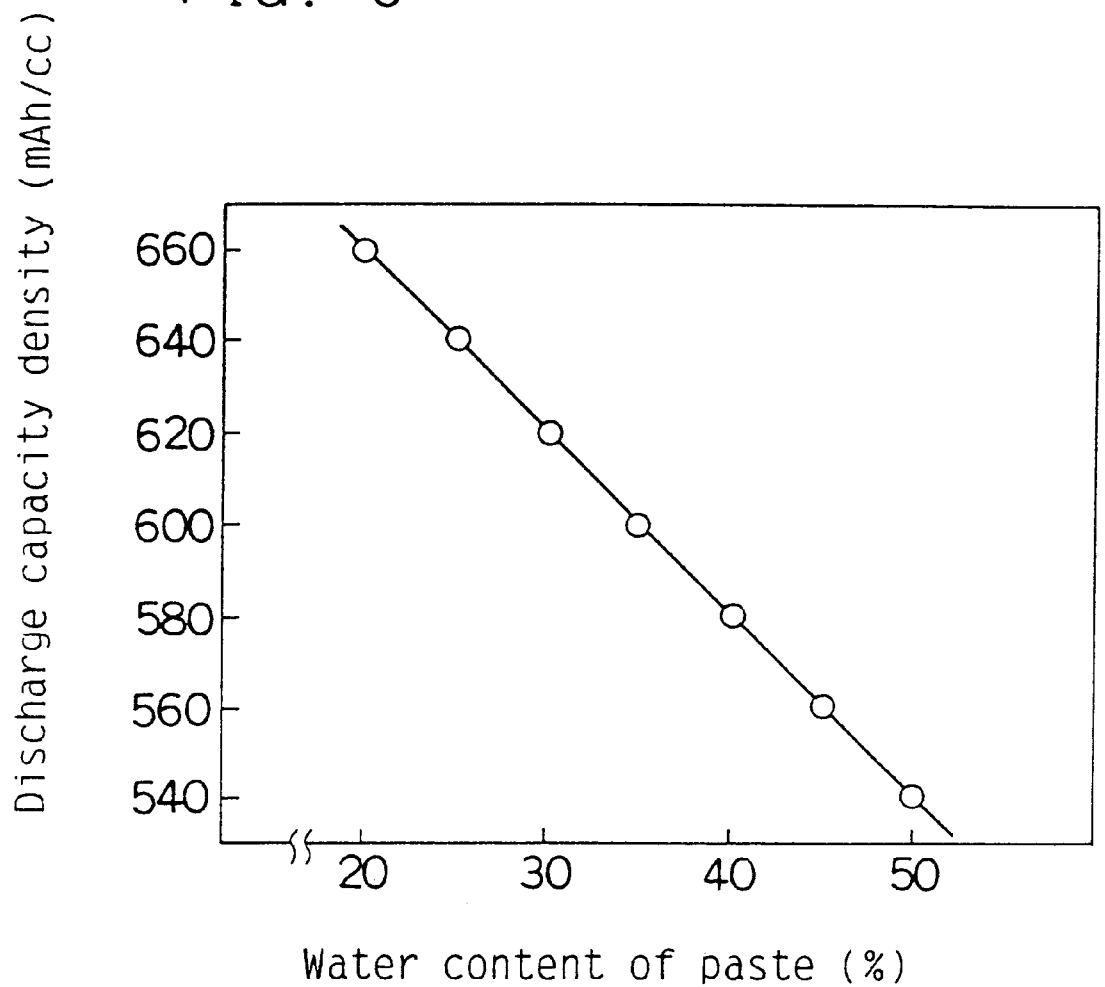
FIG. 6 is a diagram showing a relationship between the water content in the pasty mixture in accordance with the present invention and the density of the discharge capacity.

While transferring a spongy belt-like porous nickel substrate along the length of the substrate, a paste was filled into the porous substrate from a nozzle positioned close to one face of the porous substrate under the same conditions as applied in Example 4, except that the paste was kneaded with water by varying the ratio of water so that water occupied 20 to 50 wt % of the entire paste. FIG. 6 shows the relation between the content of water in the paste and the discharge capacity density of the electrode. In the mode for filling the paste in accordance with the present invention, the discharge capacity density of the electrode could be improved inversely by reducing the proportion of water in the paste.

If such factors as fluidity of the paste, smooth discharge of the paste from a nozzle, and filling amount of an active material powder into a porous substrate are taken into account, the preferable water content in the paste as a dispersing medium is 20 to 30 wt % of the entire paste.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

We claim:

1. An electrode for a battery comprising:
    a sheet of porous metal substrate having three-dimensional communicating spaces defined by a first principal face and a second principal face, most of said three-dimensional communicating spaces being filled with an active material supplied from said first principal face side and subsequently being pressed to reduce the thickness of said sheet,
    wherein said substrate has a layer filled with said active material and occupying most of the thickness of the electrode, and
    a layer of current collector connected to said second principal face and composed of a metallic foil which is not filled with active material and has reduced porosity.

2. The electrode for a battery in accordance with claim 1, wherein said layer filled with said active material occupies about 95% to about 99% of the entire thickness of the electrode and said layer of current collector occupies remaining about 5% to about 1%.

3. The electrode for a battery in accordance with claim 1, wherein said layer of current collector is formed from a portion of said porous substrate which is not penetrated by the active material supplied from said first principal face side.

4. An electrode for a battery comprising:
    a sheet of porous metal substrate having three-dimensional communicating spaces defined by a first principal face and a second principal face,
    wherein said substrate has a layer filled with an active material connected to said first principal face and occupying about 95% to about 99% of the entire thickness of said electrode, and
    a layer of current collector connected to said second principal face and formned into a foil with a porosity of about 5% to about 1% from a part of said pressed porous substrate.

5. An electrode for a battery comprising:
    a sheet of compressed porous metal substrate having three-dimensional communicating spaces defined by a first principal face and a second principal face, said three-dimensional communicating spaces being filled with an active material, and
    a thin layer of current collector on said second principal face and composed of a metallic foil which is free of active material and has reduced porosity.

6. The electrode for a battery in accordance with claim 5, wherein said layer filled with said active material occupies about 95% to about 99% of the entire thickness of the electrode and said layer of current collector occupies the remaining about 5% to about 1%.

7. The electrode for a battery in accordance with claim 5, wherein said layer of current collector is a layer of compressed porous substrate that is free of active material.

* * * * *